United States Patent [19]

Burns

[11] Patent Number: 4,953,921
[45] Date of Patent: Sep. 4, 1990

[54] GROUND ENGAGING SURFACE FOR ENDLESS TRACKS, WHEELS AND TIRES

[75] Inventor: Alan R. Burns, Mosman Park, Australia

[73] Assignee: Altrack Limited, Australia

[21] Appl. No.: 105,382

[22] PCT Filed: Oct. 21, 1986

[86] PCT No.: PCT/AU86/00318
§ 371 Date: Aug. 20, 1987
§ 102(e) Date: Aug. 20, 1987

[87] PCT Pub. No.: WO87/02953
PCT Pub. Date: May 21, 1987

[51] Int. Cl.$^5$ .............................................. B62D 55/24
[52] U.S. Cl. ........................... 305/35 EB; 305/46; 305/55; 305/53
[58] Field of Search ............... 305/16, 35 R, 35 EB, 305/39, 46, 51, 53, 60, 34, 50, 54, 55; 152/11, 12

[56] References Cited

U.S. PATENT DOCUMENTS

| | | | |
|---|---|---|---|
| 2,416,183 | 2/1947 | Kraft | 305/34 X |
| 2,807,304 | 9/1957 | Pellegrino | 152/208 |
| 3,123,410 | 3/1964 | Paul | 305/35 EB |
| 3,170,533 | 2/1965 | Fewell et al. | 305/34 X |
| 3,244,458 | 4/1966 | Frost | 305/34 |
| 3,548,962 | 12/1970 | Best | 180/9.44 |
| 3,910,649 | 10/1975 | Roskaft | 305/10 |
| 4,093,318 | 6/1978 | Edwards | 305/34 X |
| 4,119,356 | 10/1978 | Pohjola | 305/35 EB |
| 4,385,652 | 5/1983 | Frank | 305/53 X |
| 4,530,545 | 7/1985 | Bertelsen | 305/34 X |
| 4,715,668 | 12/1987 | Burmeister | 305/34 |
| 4,762,377 | 8/1988 | Burmeister | 305/34 |

FOREIGN PATENT DOCUMENTS

| | | | |
|---|---|---|---|
| 8690234 | 2/1988 | European Pat. Off. | |
| 2314394 | 1/1977 | France | |
| 850482 | 7/1981 | U.S.S.R. | 305/34 |
| 753147 | 7/1956 | United Kingdom | |
| 1416602 | 12/1975 | United Kingdom | |

Primary Examiner—Russell D. Stormer
Attorney, Agent, or Firm—Handal & Morofsky

[57] ABSTRACT

An endless track (27) for tracked vaheicles comprising an endless flexible band (33) and a plurality of spaced elongated tread elements (41) provided on the outer surface of the band. Each tread element (41) is formed of resilient material and extends transversely of the direction of travel of the track. The tread elements (41) are each in the form of a loop having a ground engaging portion and a pair of side wall portions which are load supporting when the loop is in contact with the ground. The tread elements (41) may be formed integral with, or formed separately of and secured to, the endless flexible band (33). A track assembly is also described and claimed.

17 Claims, 3 Drawing Sheets

GROUND ENGAGING SURFACE FOR ENDLESS TRACKS, WHEELS AND TIRES

This invention relates to an endless track for a tracked vehicle, and to a track assembly for a tracked vehicle.

As traction means for vehicles, the benefits of endless tracks as opposed to ground wheels provided with pneumatic tires, are well known. These benefits include better traction in soil and less ground compaction. However, endless tracks do have several deficiencies. The endless track comprises track sections joined to one another by pivotted connections which are prone to unacceptably high rates of wear, thereby limiting the service life of the tracks. A further deficiency is that endless tracks cause damage to finished road surfaces, especially when the vehicle is turning. A still further deficiency is that endless tracks are incapable of cushioning or absorbing shocks resulting from surface irregularities and so vehicle springing is required for satisfactory ride characteristics. The endless tracks also have higher noise levels and lower maximum travel speeds than wheels equiped with pneumatic tires.

With a view to overcoming some of the above-mentioned deficiencies, there have been various proposals to provide the endless tracks with ground contacting elements formed of elastomeric material rather than metal. While elastomeric ground contacting elements do allow tracked vehicles to travel on finished roads, they do not extend the service life of the tracks as the tracks are still formed of track sections joined to one another by pivotted connections which are susceptable to high rates of wear. Moreover, so as to have a useful service life, the elastomeric elements are solid and not sufficiently resilient to provide effective cushioning of shocks resulting from bumps and surface irregularities encountered by the tracks.

It is an object of the present invention to provide a useful and novel track which is of relatively simple construction, which may travel on finished road surfaces and which can at least partly absorb shocks resulting from encountering bumps and surface irregularities.

According to a first aspect of the invention there is provide an endless track for tracked vehicles comprising an endless flexible band having an inner surface and an outer surface, and a plurality of spaced elongated tread elements provided on the outer surface of the band, each treat element being formed of resilient material and extending transversely of the direction of travel of the track.

The use of the endless flexible band obviates the need for track sections joined to one another by pivotted connections and so provides for an endless track of relatively simple construction. Furthermore, the resilient nature of the tread elements permits the track to travel on finished road surfaces and provides at least some cushioning of shocks encountered during travel.

Preferably, each tread element is hollow so as to define a cavity which preferably is unpressurized.

The tread elements may be formed integral with, or formed separately of and secured to, the endless flexible band.

Preferably, each tread element is in the form of a loop having a ground engaging portion and a pair of side wall portions which are load supporting when the loop is in contact with the ground.

Preferably, the loops are open at their ends. In this way, the cavities defined within the loops open onto the exterior of the endless track.

Preferably, the loops are formed of reinforced elastomeric material.

Preferably, the endless band is formed of reinforced elastomeric material so as to be substantially longitudinally inextensible yet flexible.

Each loop may be provided with a sacrificial wear pad attached to the ground engaging portion thereof.

In one arrangement, the loops are provided by a length of resilient material arranged in a sinuous formation having alternating crests and troughs, the length of resilient material being anchored to the flexible band at locations corresponding to at least some of the troughs.

According to a second aspect of the invention there is provided a track assembly for a tracked vehicle, the track assembly comprising a plurality of track wheels at least one of which constitutes a drive wheel, and an endless track entrained around the track wheels, the endless track being in accordance with the first aspect of the invention as defined hereinbefore.

Although a positive drive may be provided between the or each drive wheel and the track, it is preferred that friction drive be employed. With friction drive, there is frictional engagement between the inner surface of the endless band and the outer periphery of the or each drive wheel so that the drive wheel frictionally transmits power to the endless track. To facilitate frictional engagement between the drive wheel and the endless band, the outer periphery of the drive wheel may be coated with elastomeric material.

Preferably, the track wheels are each provided with a circumferential recess which receives the endless band and serves to guide the band in its circuitous path around the track wheels.

Preferably, a tensioning means is provided for tensioning the endless band about the track wheels. The tensioning means may comprise means for urging one of the endmost track wheels in a direction away from the other endmost track wheel.

The invention will be better understood by reference to the following description of one specific embodiment thereof as shown in the accompanying drawings in which.

Figure 1:
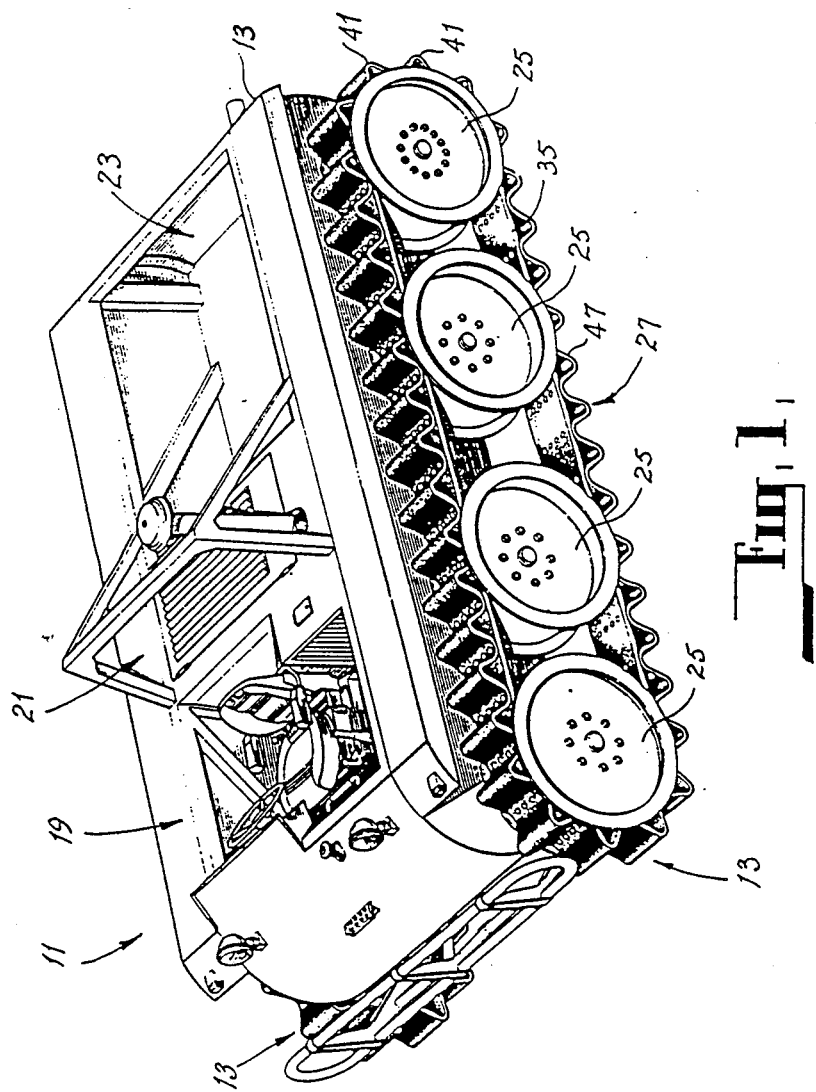
FIG. 1 is a perspective view of a work vehicle provided with traction means incorporating an endless track assembly according to the embodiment.
Figure 2:
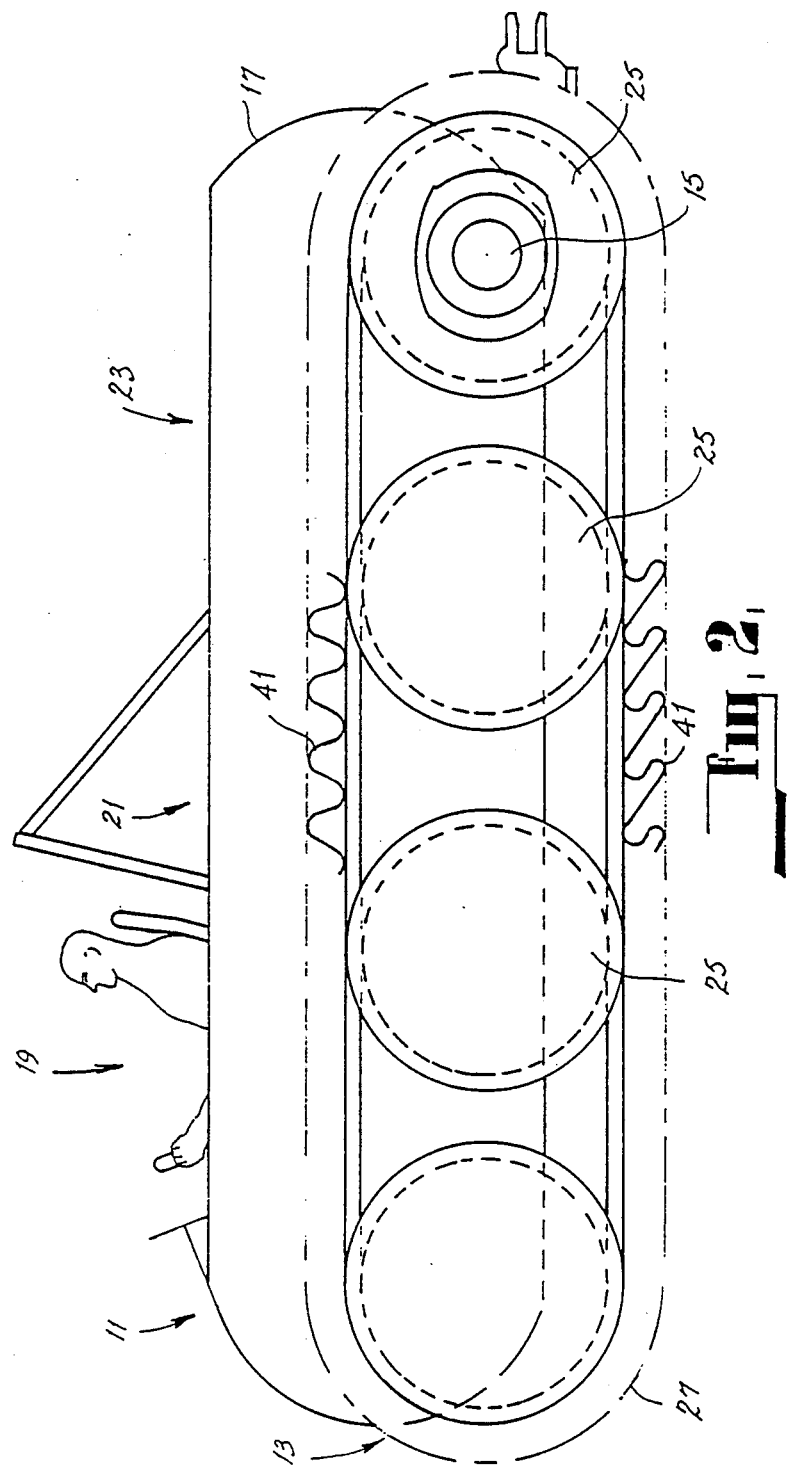
FIG. 2 is a schematic side view of the work vehicle of FIG. 1 with the lower run of the endless track assembly shown in the condition it assumes under driving load.

Referring to FIG. 1 of the drawings, there is shown an amphibious work vehicle 11 having a traction means which includes a pair of track assemblies 13 according to the embodiment arranged on opposite sides of the vehicle. The vehicle is provided with a frame structure 15 and a body 17 which is carried on the frame structure and which provides an operator's cab 19, an engine compartment 21, and a load carrying compartment 23.

Each track assembly 13 comprises a plurality of track wheels 25 and an endless track 27 fitted onto the track wheels. The track wheels 25 are supported on axles which are directly connected to the frame structure of the vehicle; that is, there is no spring system between the frame structure and the axles.

One of the endmost track wheels constitutes a drive wheel to which power is selectively transmitted from an engine mounted in the engine compartment.

A tensioning means (not shown) is provided for tensioning the endless belt about the track wheels. The tensioning means is the form of a means supporting the particular endmost track wheel which is not the drive wheel on the frame structure for movement along the fore-and-aft direction of the vehicle, and a power device (such as a hydraulic ram) for controlling such movement. With this arrangement, the movable endmost wheel can be moved in the direction away from the drive wheel thereby to tension the endless track, as will become more apparent later.

Figure 3:
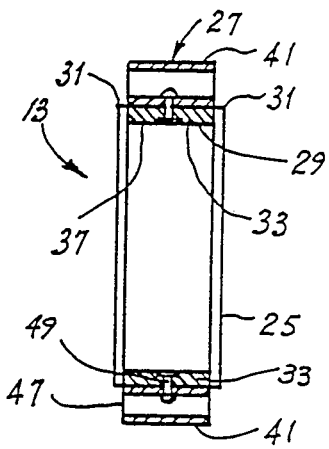
FIG. 3 is a view of the track assembly in part section.
Figure 4:
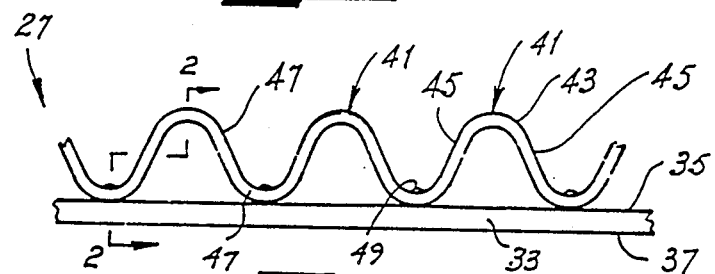
FIG. 4 is a detail view of part of the upper run of an endless track of the track assembly.

The track wheels 25 (including the drive wheel) are each provided with a circumferential recess 29 to guidingly receive the endless track for retaining the track in alignment with the track wheels. The recesses 29 are formed by circumferential flanges 31 provided on the ends of the track wheels, as best seen in FIG. 3 of the drawings.

The endless track 27 comprises an endless flexible band 33 having an outer face 35, an inner face 37 and two longitudinal edges.

The endless band 33 is received in the circumferential recesses 29 of the track wheels 25 with the longitudinal edges of the band closely adjacent the circumferential flanges 31 of the track wheels.

While being flexible, the endless band 33 is also longitudinally inextensible in character so as to resist undue stretching. To this end, the endless band may be in the form of an elastomeric material reinforced with steel cables or other reinforcing elements.

The endless track 27 further comprises a plurality of spaced, elongated tread elements 41 provided on the outer face of the endless band. The treat elements 41 are formed of resilient material and extend transversely of the direction of travel of the vehicle. Each tread element 41 is in the form of a loop having a ground contacting portion 43 and a pair of side wall portions 45 which are load supporting when the tread element is in contact with the ground.

While the tread elements 41 may be formed integrally with the endless band 33, in this embodiment the tread elements are formed separately of and secured to the band. More particularly, the tread elements are provided by a length 47 of resilient material which is arranged in a sinuous formation having alternate crests and troughs. Fastening means 49 secure the length of material 47 to the endless band 33 at locations corresponding to each of the troughs. The resilient material is required to have sufficient compressive strength to support the loads imposed on it when the loops are under load and to this end may be in the form of reinforced elastomeric material.

The outer periphery of the drive wheel is provided with a friction surface for frictional engagement with the inner surface of the endless band. In this way, the drive wheel frictionally transmits power to the endless band. Tension in the endless band is regulated by the tensioning means so as to maintain the frictional driving relationship between the endless band and the drive wheel.

A scraper (not shown) or other means may be provided to displace sand and other debris gathering between the inner surface of the endless band and the outer peripheries of the track wheels.

The ground contacting portion of each loop may be provided with a sacrificial wear pad (not shown) if desired so as to extend the service life of the endless track.

Figure 5:
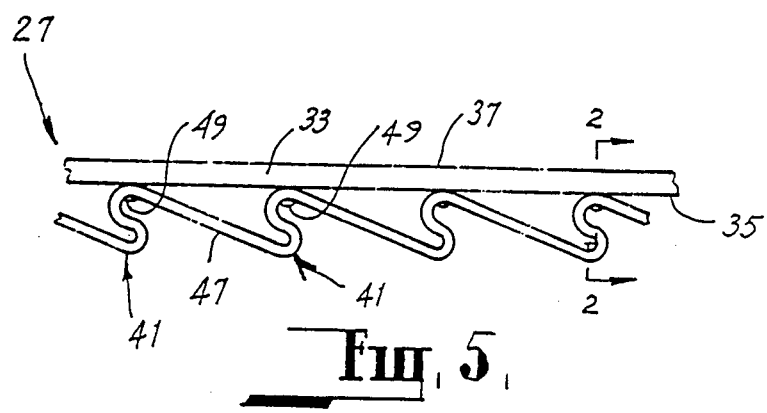
FIG. 5 is a detail view of part of the lower run of the endless track, deformed under driving load.

In operation, the tread elements deform under load and assume a configuration illustrated in FIG. 5 when the vehicle is undergoing straight line motion. When the vehicle is turning on finished road surfaces, the tread elements twist and drag over the surface without inflicting damage thereto.

The ability of the tread elements to deform under load provides the vehicle with a degree of springing which at least partially absorbs shock forces resulting from bumps and other surface irregulaties encountered in the path of the vehicle.

The traction means also provides a propulsion system for the vehicle when operating in water. In such situations, the lower run of the endless track is submersed and the upper run is above the water line. In this way, the tread elements act as paddles as the endless track follows its circuitous path.

From the foregoing, it is evident that the present invention provides both an endless track assembly and an endless track, each of which is of relatively simple construction and which can be operated on finished road surfaces without inflicting damage to such surfaces.

Although the invention has been described as applied to an amphibious work vehicle, it will be recognised that it may be applied to any suitable tracked vehicle including earth-moving machines, agricultural machines and snowmobiles.

The claims defining the invention are as follows:

1. An endless track for tracked vehicles comprising an endless flexible band having an inner surface and an outer surface, and a plurality of elongated tread elements provided in a spaced relationship on said outer surface of said band and extending transversely with respect to the direction of motion of said track, each of said track elements being of resiliently deformable construction and being hollow, defining a cavity, said cavity being unpressurized and open to ambient atmospheric pressure.

2. An endless track as claimed in claim 1, wherein said endless band is formed of reinforced elastomeric material so as to be substantially longitudinally inextensible yet flexible.

3. An endless track according to claim 1 wherein the tread elements are formed integral with the endless band.

4. An endless track according to any one of claims 1 wherein the tread elements are formed separately of and secured to the endless band.

5. An endless track according to claim 4 wherein the loops are provided by a length of resilient material arranged in a sinuous formation having alternating crests and troughs, the length of material being anchored to the flexible band at locations corresponding to at least some of the troughs.

6. A track assembly for a tracked vehicle, the track assembly comprising a plurality of track wheels at least one of which constitutes a drive wheel, and an endless track according to claim 1 entrained around the track wheels.

7. A track assembly according to claim 6 wherein a friction drive is provided between the or each drive wheel and the endless band.

8. A track assembly according to claim 6 wherein the track wheels are each provided with a circumferential recess which receives the endless band and serves to guide the band in its circuitous path around the track wheels.

9. A tracked vehicle having an endless track according to claim 6.

10. A tracked vehicle having a track assembly according to claim 6.

11. An endless track as claimed in claim 1, wherein each tread element is in the form of a loop that engages the ground.

12. An endless track as claimed in claim 11 wherein said loops have ends which are open.

13. An endless track according to claim 12 wherein the loops are formed of reinforced elastomeric material.

14. An endless track for tracked vehicles comprising:
  (a) an endless flexible band, formed of a non-stretchable reinforced elastomeric material, having an inner surface and an outer surface;
  (b) a plurality of elongated tread elements provided by a length of resilient material arranged in a sinuous formation of crests and troughs around said endless flexible band, said troughs contacting said outer surface of said flexible band and said crests forming unpressurized loops; and
  (c) fastening means securing said length of resilient material to said endless flexible band where said troughs contact said flexible band.

15. A track assembly for a tracked vehicle comprising:
  (a) a plurality of wheels wherein at least one wheel is a drive wheel;
  (b) an endless flexible band, formed of a non-stretchable reinforced elastomeric material, having an inner surface and an outer surface;
  (c) a plurality of elongated treat elements provided by a length of resilient material arranged in a sinuous formation of crests and troughs around said endless flexible band, said troughs contacting said outer surface of said flexible band and said crests forming unpressurized loops; and
  (d) fastening means securing said length of resilient material to said endless flexible band where said troughs contact said flexible band.

16. A track assembly as claimed in claim 15, wherein a friction drive is provided between said at least one drive wheel and said endless flexible band.

17. A track assembly as claimed in claim 15, wherein said track wheels are each provided with a circumferential recess which receives said endless band and serves to guide said band in its circuitous path around said track wheels.

* * * * *

UNITED STATES PATENT AND TRADEMARK OFFICE
CERTIFICATE OF CORRECTION

PATENT NO. : 4,953,921

DATED : Sept. 4, 1990

INVENTOR(S) : Alan R. Burns

It is certified that error appears in the above-identified patent and that said Letters Patent is hereby corrected as shown below:

Column 1, line 50 delete "treat" and substitute --tread--.

Column 4, Claim 1, line 43, delete "track" and substitute --tread--.

Column 4, Claim 4, line 54, delete "any one of claims" and substitute -- claim --.

Column 6, Claim 15, line 13, delete "treat" and substitute --tread--.

Signed and Sealed this

Sixth Day of April, 1993

*Attest:*

STEPHEN G. KUNIN

*Attesting Officer*    *Acting Commissioner of Patents and Trademarks*